US008357763B2

(12) United States Patent
Song et al.

(10) Patent No.: US 8,357,763 B2
(45) **Date of Patent: *Jan. 22, 2013**

(54) ADHESION PROMOTER

(75) Inventors: Guiqin Song, Milton (CA); Nan-Xing Hu, Oakville (CA); T. Brian McAneney, Burlington (CA); Gordon Sisler, St. Catharines (CA)

(73) Assignee: Xerox Corporation, Norwalk, CT (US)

( * ) Notice: Subject to any disclaimer, the term of this patent is extended or adjusted under 35 U.S.C. 154(b) by 1320 days.

This patent is subject to a terminal disclaimer.

(21) Appl. No.: 11/743,447

(22) Filed: May 2, 2007

(65) Prior Publication Data

US 2008/0274420 A1 Nov. 6, 2008

(51) Int. Cl.

| | |
|---|---|
| ***G03G 9/00*** | (2006.01) |
| ***C07F 7/10*** | (2006.01) |
| ***C07F 7/18*** | (2006.01) |
| ***C08K 3/24*** | (2006.01) |
| ***C08K 5/5419*** | (2006.01) |
| ***C08K 5/544*** | (2006.01) |

(52) U.S. Cl. .............. 525/477; 106/287.11; 106/287.14; 106/287.16; 281/21.1; 428/343; 428/353; 428/355 R; 428/447; 428/448; 524/188; 524/261; 524/262; 525/474; 526/931; 526/935

(58) Field of Classification Search ........................ None
See application file for complete search history.

(56) References Cited

U.S. PATENT DOCUMENTS

| | | | | |
|---|---|---|---|---|
| 4,029,827 | A | 6/1977 | Imperial et al. | |
| 4,101,686 | A | 7/1978 | Strella et al. | |
| 4,140,733 | A | 2/1979 | Meyer, Jr. et al. | |
| 4,185,140 | A | 1/1980 | Strella et al. | |
| 4,197,380 | A | 4/1980 | Chao et al. | |
| 4,576,985 | A | 3/1986 | Ono | |
| 4,618,640 | A | 10/1986 | Tsuchida et al. | |
| 4,660,858 | A | 4/1987 | Flanagan | |
| 4,712,808 | A | 12/1987 | Beh-Forrest et al. | |
| 4,772,650 | A | 9/1988 | Ou-Yang | |
| 4,942,195 | A | 7/1990 | Flanagan et al. | |
| 5,021,499 | A | 6/1991 | Tochinai et al. | |
| 5,037,874 | A | 8/1991 | Nuttens et al. | |
| 5,057,561 | A | 10/1991 | Manica et al. | |
| 5,063,271 | A | 11/1991 | Jones | |
| 5,157,445 | A | 10/1992 | Shoji et al. | |
| 5,363,994 | A * | 11/1994 | Angeline | 222/529 |
| 5,401,791 | A | 3/1995 | Milks | |
| 5,443,674 | A * | 8/1995 | Fresonke et al. | 156/331.7 |
| 5,518,571 | A | 5/1996 | Puerkner et al. | |
| 5,686,523 | A * | 11/1997 | Chen et al. | 524/547 |
| 5,728,203 | A * | 3/1998 | Vorse et al. | 106/287.11 |
| 5,882,466 | A * | 3/1999 | Grootaert et al. | 156/329 |
| 6,060,550 | A | 5/2000 | Simon et al. | |
| 6,582,829 | B1 | 6/2003 | Quinn et al. | |
| 6,794,443 | B2 | 9/2004 | Chu et al. | |
| 6,797,774 | B2 | 9/2004 | Kijima | |
| 6,800,680 | B2 | 10/2004 | Stark et al. | |
| 6,833,404 | B2 | 12/2004 | Quinn et al. | |
| 6,890,982 | B2 | 5/2005 | Borsinger et al. | |
| 6,989,413 | B2 | 1/2006 | Hazen et al. | |
| 7,579,394 | B2 * | 8/2009 | Song et al. | 524/261 |
| 7,754,812 | B2 * | 7/2010 | Song et al. | 525/56 |
| 2003/0108737 | A1 | 6/2003 | Timmons et al. | |
| 2004/0185272 | A1 | 9/2004 | Kaplan et al. | |
| 2004/0235995 | A1 * | 11/2004 | Aydin et al. | 524/262 |
| 2005/0178664 | A1 * | 8/2005 | Ostrovsky | 205/91 |
| 2006/0008727 | A1 | 1/2006 | Gervasi et al. | |
| 2007/0190345 | A1 * | 8/2007 | Sutter et al. | 428/448 |

OTHER PUBLICATIONS

U.S. Appl. No. 11/532,704 to Ram et al., filed Sep. 18, 2006.
U.S. Appl. No. 11/623,509 to Song et al., filed Jan. 16, 2007.
U.S. Appl. No. 11/623,640 to Song et al., filed Jan. 16, 2007.

* cited by examiner

*Primary Examiner* — David Sample
*Assistant Examiner* — Jeff Vonch
(74) *Attorney, Agent, or Firm* — Oliff & Berridge, PLC

(57) ABSTRACT

An adhesion promoter for a hot melt adhesive or a pressure sensitive adhesive prepared by admixing a silane composition with an aqueous buffer solution, where the silane composition includes at least two silane compounds. The adhesive is able to bind at very low surface free energy substrates, such as Xerographic prints contaminated by silicone fuser oil. The hot melt adhesive maintains a substantially stable viscosity at temperature ranging from about 100° C. to about 200° C.

22 Claims, No Drawings

ADHESION PROMOTER

BACKGROUND

The present disclosure generally relates to adhesion promoters comprising a silane composition admixed with an aqueous buffer solution, where the silane composition comprises at least two hydrolytic silane compounds, and the use of such adhesion promoters in methods for promoting adhesion of adhesives to a substrate. In embodiments, the adhesion promoter may be used in a hot melt adhesive or a pressure sensitive adhesive that is to be applied to a substrate.

The addition of the adhesion promoter to hot melt adhesives or pressure sensitive adhesives improves adhesion to very low surface free energy substrates. The admixed silane composition with aqueous buffer solution improves the thermal stability of the adhesive and the viscosity of the adhesive remains relatively constant at temperatures, for example, ranging from about 100° C. to about 200° C. The adhesive containing the admixed silane adhesion promoter is thus able to bind very low surface free energy substrates such as Xerographic prints contaminated with fuser oil, and maintains a substantially stable viscosity at adhesive application or operating temperatures from about 100° C. to about 200° C.

REFERENCES

In a typical imaging device, a light image of an original to be copied is recorded in the form of a latent image upon a photosensitive member, and the latent image is subsequently rendered visible by the application of resin particles and pigment particles, or toner. The visible toner image is then in a loose powdered form and can be easily disturbed or destroyed. The toner image may be fixed or fused upon a support, which may be a support sheet such as plain paper, using a fuser roll.

To ensure and maintain good release properties of the fuser roil, it has become customary to apply release agents to the fuser roll during the fusing operation. Typically, these materials are applied as thin films of, for example, nonfunctional silicone oils or mercapto- or amino-functional silicone oils, to prevent toner offset.

U.S. Pat. No. 4,029,827 discloses the use of polyorganosiloxanes having mercapto functionality as release agents.

U.S. Pat. No. 4,101,686 and U.S. Pat. No. 4,185,140 disclose polymeric release agents having functional groups such as carboxy, hydroxy, epoxy, amino, isocyanate, thioether, or mercapto groups.

U.S. Pat. No. 5,157,445 discloses toner release oil having a functional organopolysiloxane.

Fuser oil unavoidably contaminates the surface of prints during Xerographic printing processes. Because the fuser oil is chemically bound on the paper surface during the hot fusing process, especially for example with mercapto or amino functionalized fuser oil, it may be difficult to wipe off the fuser oil, and the surface free energy of the Xerographic prints is significantly lowered because of the oil contamination and thus causes poor binding between the adhesive and prints.

The adhesion may be improved by adding amino or mercapto functional hydrolytic silane compounds or oligosiloxane silane compounds to adhesives as adhesion promoters, but at the same time the silane compounds may decrease the pot life of the adhesive. The viscosity may continuously increase during the application process at the application temperature such as from about 100° C. to about 200° C. The viscosity continuously increases and may cause operating problems.

In some extreme cases, such as Xerographic prints printed on offset preprint forms, there is no commercially available adhesive that can be used to bind these kind of prints.

U.S. patent application Ser. No. 11/532,704, incorporated herein by reference in its entirety, describes an adhesion promoter comprising a silane compound and a release agent and/or adhesive.

While hot melt adhesives are known in the prior art, for example, U.S. Pat. No. 5,401,791 discloses bookbinding adhesives, U.S. Pat. No. 4,772,650 discloses bookbinding adhesive compositions for book casemaking, U.S. Pat. No. 4,712,808 discloses bookbinding adhesive compositions for hinge joint, U.S. Pat. No. 4,660,858 discloses bookbinding adhesive compositions for book lining, and U.S. Pat. No. 4,340,733 discloses polyethylene based bookbinding hot melt adhesives, they are all unsatisfactory in adhesive strength for perfect book binding applications when they are used for binding Xerographic prints/paper substrates contaminated by fuser oils.

U.S. Pat. No. 6,800,680, U.S. Pat. No. 6,797,774, U.S. Pat. No. 6,794,443, U.S. Pat. No. 6,582,829, U.S. Pat. No. 5,518,571, U.S. Pat. No. 5,057,561 and U.S. Pat. No. 4,942,195, disclose varies kinds of polymers for hot melt adhesive application.

U.S. Pat. No. 6,989,413, U.S. Pat. No. 6,833,404, U.S. Pat. No. 5,021,499, U.S. Pat. No. 4,618,640 and U.S. Pat. No. 4,197,380 disclose tackifying resins for hot melt adhesive application.

U.S. Pat. No. 6,890,982, U.S. Pat. No. 6,060,550, U.S. Pat. No. 5,063,271 and U.S. Pat. No. 5,037,874 disclose waxes for hot melt adhesive application.

U.S. Pat. No. 4,576,985 and U.S. Pat. No. 4,197,380 disclose hot melt adhesives for low surface energy substrates.

SUMMARY

In embodiments, described is an adhesion promoter for hot melt adhesives and pressure sensitive adhesives, comprising a silane composition formed by admixing at least two hydrolytic silane compounds with an aqueous buffer solution, wherein at least one of the at least two hydrolytic silane compounds comprises the silane group of $—SiR_2X$, wherein R is a non-hydrolyzable organic group, and X is a hydrolytic group.

In further embodiments, described is a process of forming an adhesion promoter comprising admixing a silane composition with at least one aqueous buffer solution, wherein the silane composition comprises at least two silane compounds, wherein the at least two silane compounds are in a weight ratio of from about 90:10 to about 10:90.

In yet further embodiments, described is a hot melt adhesive or pressure sensitive adhesive including at least one adhesive material and at least one adhesion promoter comprising a silane composition formed by admixing at least two hydrolytic silane compounds with an aqueous buffer solution, wherein the at least two hydrolytic silane compounds are in a ratio of from about 90:10 to about 10:90.

EMBODIMENTS

As explained above, it is known to apply release agents to the fuser roil to provide the necessary release of a substrate containing an image thereon from the fuser roll after the toner image has been formed on the substrate. Release agents are known to those of ordinary skill in the art, and include release agents such as disclosed in U.S. Publication No. 2006/0008727, U.S. Publication No. 2004/0185272 and U.S. Publication No. 2003/0108737, each of which is incorporated herein by reference in its entirety. As used herein, "substrate" refers to any media that may be printed on, such as paper, including synthetic paper, pre-print forms, plastic films, transparency, cardboard, cloth, etc.

Xerographic prints may be contaminated by a release agent such as silicone fuser oil due to the printing process. Some release agent may remain on a toner image that may cover any portion of the substrate and on the substrate itself. In other words, some release agent may remain on a final substrate having an image thereon and may at least partially cover a substrate having no toner image or a substrate having a toner image thereon. "Partially" refers to the release agent covering from above 0 percent to less than 100 percent of the substrate, such as from about 10 percent to about 90 percent or from about 20 percent to about 80 percent of the substrate. The release agent may chemically bond to the surface of the prints because of the reactive functional group such as amino or mercapto functional group in fuser oil during fusing process at high pressure and high temperature. The surface free energy (SFE) of the prints may thus dramatically drop from a range of higher than about 30 $mN/m^2$ for typical substrates such as paper to a range of from about 8 $mN/m^2$ to less than about 30 $mN/m^2$. Generally, commercially available hot melt adhesives bind to substrates having a SFE higher than about 30 $mN/m^2$.

Any release agent remaining on the substrate, with or without a toner image thereon, may be detrimental to an adhesive attempting to adhere to the substrate having a toner image. This is particularly important when the substrate is to be laminated or coated with a hot melt adhesive, such as an adhesive used in bookbinding. This release agent may also prevent materials utilizing adhesives, for example, POST-IT® notes, from adhering to the substrate.

Typical release agents used in releasing a substrate from a fuser roll in an imaging device include poly-organofunctional siloxanes, such as amino-functional silicone oils, such as methyl aminopropyl methyl siloxane, ethyl aminopropyl methyl siloxane, benzyl aminopropyl methyl siloxane, dodecyl aminopropyl methyl siloxane, aminopropyl methyl siloxane, and the like.

Disclosed herein is an adhesion promoter that promotes the adhesion of an adhesive to a substrate with surface free energy lower than 30 $mN/m^2$. The substrate may be at least partially covered by a release agent. The adhesion promoter may also promote adhesion of an adhesive to a substrate having no toner image or a substrate having a toner image without being covered by a release agent.

It is desirable to have an adhesive with a stable viscosity that is maintained constant during the application process. For example, the adhesive desirably has a stable viscosity at the application temperature, such as a temperature from about 100° C. to about 200° C., such as from about 140° C. to about 190° C. or from about 150° C. to about 180° C.

An adhesive that incorporates a conventional adhesion promoter may encounter issues associated with the pot life issue. That is, the adhesive may not be able to be kept long enough in increased temperatures to meet the requirements during the application process, for example in bookbinding applications. The viscosity of the adhesive containing a conventional adhesion promoter may continuously increase and cause operating problems.

It is thus desirable to have an adhesion promoter that can be added to a hot melt adhesive or pressure sensitive adhesive and at the same time maintain the thermal stability of the adhesive, or maintain a long enough pot life and constant viscosity of the adhesive during the application process. As used herein, "pot life" refers to the storage life of the adhesive at application temperatures, such as at temperatures of from about 100° C. to about 200° C., such as from about 140° C. to about 190° C. or from about 150° C. to about 180° C.

A thermally stable adhesive is one that substantially maintains its viscosity and adhesion properties over a period of time at application temperatures described herein. A stable viscosity, for example, is an increase or decrease in viscosity of no more than 1000 cp over the aging process at the application temperature, such as from about 100 to about 800 cp over 8 hours at an application temperature or from about 200 to about 600 cp over 8 hours at an application temperature.

In embodiments, described is an adhesion promoter that includes at least two silane compounds that are mixed with an aqueous buffer solution to form an admixture.

In embodiments, the adhesion promoter before mixture with the buffer solution may be a silane composition of at least two silane compounds, for example, the silane compounds may each be an alkyloxysilane compound or a glycidoxy silane compound. Further examples include organic silane compounds, which may comprise at least one silane group represented by the following formula:

$$—Si(R)_{3-m}X_m$$

wherein R may be a $C_1$-$C_{30}$ hydrocarbyl including an alkyl, an aryl, a vinyl and the like, wherein the hydrocarbyl may further contain a halogen, nitrogen, oxygen or sulfur atom. Illustrative examples of R may include methyl, ethyl, propyl, octyl, phenyl, methacryloxypropyl, aminopropyl, aminoethylaminopropyl, phenylaminopropyl, chloropropyl, mercaptopropyl, acryloxypropyl 3-glycidoxypropyl, trifluoropropyl, heptadecafluorodecyl, and isocyanatopropyl group and the like. X may represent a hydrolyzable functional group, a $C_1$-$C_{20}$ alkoxy group, a hydroxy group, a carboxylate group, an alkoxy group, an arylalkyloxy group, and an aryloxy group, a halogen or a hydrogen atom, and m is an integer of 1, 2 or 3.

In embodiments, R may be a non-hydrolyzable organic group, X may be a hydrolytic group and m may be an integer of 1, 2 or 3. X may include a halide, a hydroxyl group, a carboxylate group, an alkoxy group, an arylalkyloxy group and an aryloxy group. The hydrolytic silane compound may contain in total two of the hydrolytic X groups.

Yet further examples include silane compounds, which may comprise at least one silane group represented by the following formula;

$$—SiR_2X$$

wherein R is a non-hydrolyzable organic group, and X is a hydrolytic group selected from a halide, a hydroxyl group, a carboxylate group, an alkoxy group, an arylalkyloxy group, and an aryloxy group. In embodiments, the hydrolytic silane compound comprising the silane group of $—SiR_2X$ has weight ranging from about 5 weight percent to about 90 weight percent of the total silane composition, such as from about 10 weight percent to about 85 weight percent or from about 15 weight percent to about 80 weight percent of the total silane composition.

In embodiments, the hydrolytic silane compounds may include a functional group. Examples of functional groups may include, for example, an amino group, a mercapto group, an epoxy group and a vinyl group.

Examples of silane compounds suitable for use herein include aminoalkylsilane, mercaptoalkylsilane and mixtures thereof, for example, 4-aminobutyltriethoxysilane, 1-amino-2-(dimethylethoxysilyl)propane, N-(2-aminoethyl)-3-aminoisobutyldimethylmethoxysilane, N-(2-aminoethyl)-3-aminoisobutyldimethylmethoxysilane, (aminoethylaminomethyl)phenethyltrimethoxysilane, N-(2-aminoethyl)-3-aminopropylmethyldimethoxysilane, N-(2-aminoethyl)-3-aminopropylsilanetriol, N-(2-aminoethyl)-3-aminopropyltriethoxysilane, N-(2-aminoethyl)-3-aminopropyltrimethoxysilane, N-aminoethyl-AZA-2,2,4-trimethylsilacyclopentane, N-(6-aminohexyl)aminomethyltrimethoxysilane, N-(6-aminohexyl)aminopropyltrimethoxysilane, N-(2-aminoethyl)-11-aminoundecyltrimethoxysilane, 3-aminopropylmethylbis(trimethylsiloxy) silane, 3-aminopropyldimethylethoxysilane, 3-aminopropyltrimethoxysilane, 3-aminopropyltris(methoxyethoxyethoxy)silane, 3-(triethoxysilyl)propylsuccinic anhydride, tris(3-trimethoxysilylpropyl)iso-cyanurate, (3-trimethoxysilylpropyl)diethylene-triamine, methyltrichlorosilane, dimethyldichlorosilane, methyltriethoxysilane, ethyltrichlorosilane, ethyltrimethoxysilane, dimethyldimethoxysilane, methyltriethoxysilane, ethyltriethoxysilane, propyltrimethoxysilane, amino silane hydrochloride, 3-glycidoxypropyl trimethoxysilane (Z-6040, available from Dow Corning; KBM 403, available from Shin-Etsu), methyltrimethoxysilane (Z-6070, available from Dow Corning; KBM 13, available from Shin-Etsu), methacryloxypropyltrimethoxysilane (Z-6030, available from Dow Corning; KBM502, available from Shin-Etsu), aminopropyltrimethoxysilane (Z-6011, available from Dow Corning; KBM903, available from Shin-Etsu), aminoethylaminopropyltrimethoxysilane (KBM603, available from Shin-Etsu or DOW Z 6032, available from Dow Corning; trifluoropropyltrimethoxysilane (KBM7103, available from Shin-Etsu), heptadecafluorodecyltrimethoxysilane (KBM7803, available from Shin-Etsu), isocyanatopropyltriethoxysilane (KBE9007, available from Shin-Etsu), aminopropyltriethoxysilane (KBE903, available from Shin-Etsu), aminoethylaminopropyltriethoxysilane (KBE603, available from Shin-Etsu), alkyltrimethoxysilane (DOW HV 10, available from Dow Corning), and a coating having trifluoropropy trimethoxysilane, vinylmethoxysilane, tetra(2-methoxyethoxy) silane (DOW 4040 Prime Coat, available from Dow Corning), mixtures thereof, and the like.

The adhesion promoter disclosed herein includes a silane composition having at least two different silane compounds, for example, the silane composition includes from about 2 to about 5 silane compounds, such as from about 2 to about 3 silane compounds or about 2 silane compounds.

In embodiments, the silane composition suitable for use in the adhesion promoter disclosed herein includes at least two silane compounds selected from the hydrolytic silane compounds disclosed above. Such a silane composition will include a first silane compound and a second silane compound in a weight ratio of from about 90:10 to about 10:90, such as about 25:75 to about 75:25 or from about 40:60 to about 60:40.

In embodiments, the silane composition may include any two silane compounds, as long as each silane compound has a different functional group, for example N-(2-aminoethyl)-3-aminoisobutyldimethylmethoxysilane as the first silane compound and N-(2-aminoethyl)-3-aminopropylmethyldimethoxysilane as the second silane compound in a weight ratio of from about 75:25 to about 25:75, or from about 60:40 to about 25:75.

Utilizing a silane composition have at least two silane compounds, as opposed to having only one silane compound, provides improved thermal stability of the hot melt adhesive. For example, the viscosity of an adhesive having the admixture of the silane composition disclosed herein and the aqueous buffer solution is stable as defined herein for a time of from about 8 hours to about 72 hours, such as from about 8 hours to about 60 hours or from about 9 hours to about 50 hours at an application temperature described herein. An improved thermal stability of the adhesive in turn decreases or eliminates operational problems caused by an adhesive having a pot life less than that described herein at the application temperatures of the adhesive described herein.

In embodiments, the silane composition is admixed with aqueous buffer solution before incorporation into an adhesive. The aqueous buffer solution may include a buffer agent. The aqueous buffer solution is made by dissolving the buffer agent into distilled water. The buffer agent may be an inorganic salt, for example an alkali metal phosphate, an alkali metal sulfite and the like or an aqueous solution of an inorganic salt. Other suitable buffer agents include aqueous solutions of potassium phosphate monobasic, potassium phosphate dibasic, sodium hydrogen sulfite, mixtures thereof and the like, for example dissolved in distilled water.

In embodiments, the aqueous buffer solution may be prepared to form from about 1% to about 50% by weight buffer agent, such as from about 5% to about 25% by weight buffer agent, and for example from about 5% to about 15% by weight buffer agent.

In embodiments, the pH of the buffer solution may be, for example, from about 2 to about 10, such as from about 4 to about 9.

In embodiments, the aqueous buffer solution may be added to the silane compound, for example in a silane to buffer solution ratio of from about 1:0.005 to about 1:0.5, such as a weight ratio of about 1:0.15 and for example a weight ratio of about 3:0.35. The buffer solution may be added to the silane compound while agitating the silane compound at room temperature. The silane compound temperature goes up after the adding of the buffer solution because this may be an exothermic reaction process. The adhesion promoter may be kept agitating from about 1 hour to about 3 hours before it is incorporated into hot melt adhesives or pressure sensitive adhesives. The shelf life for the admixture of silane composition and aqueous buffer solution may be as long as three days or longer at room temperature.

Upon addition of the aqueous buffer solution to the silane composition, the at least two silane compounds of the silane composition form a hydrolytic product, that is, the silane composition comprises a hydrolytic product of the at least two silane compounds. The admixture of silane composition and aqueous buffer solution described herein provides at least two beneficial functions in order to promote adhesion of the adhesive to the substrate: (1) a reactive silicone group, that is, a group reactive with silicone, for bonding with the Xerographic print or substrate, such as a methoxy or an ethoxy group, and (2) an organic component for compatibility with the adhesive.

The admixed adhesion promoter may be utilized in a variety of ways to promote the adhesion of an adhesive to a substrate. The admixed adhesion promoter promotes adhesion to the substrate in locations where there is a toner image, where there is not toner image, and where there is a toner image at least partially covered by a release agent. In other words, the adhesion promoter promotes adhesion of an adhesive to a substrate, regardless if the substrate has a toner image thereon, has release agent thereon, or if the substrate has a toner image thereon, that is at least partially covered by a release agent.

In embodiments, the admixed adhesion promoter composed of a silane composition having at least two silane compounds may be used as a separate coating on the substrate to be used as a primer, dispersed within a release agent, or incorporated into an adhesive In embodiments, the admixed adhesion promoter may be added directly to the adhesive of the laminate or the book-binding material, such as into pressure sensitive adhesive formulations or hot melt adhesive formulations. The adhesive comprises a hot melt adhesive or pressure sensitive adhesive and an adhesion promoter comprised of a silane composition admixed with an aqueous buffer solution.

Suitable hot melt adhesives for use herein include most commercially available hot melt adhesives, such as polyethylene, poly(ethylene/vinyl acetate), polystyrene, polyamide, a polyolefin based polymer, polyester, phenol-formaldehyde resin, etc., of a homopolymer or a block copolymer based hot melt adhesives. Other examples of commercially available hot melt adhesives include for example HM220 available from Horizon and US661 manufactured by U.S. Adhesives.

Suitable hot melt adhesives formulation for use herein may include thermoplastics or materials which appear to be thermoplastic including components such as polymer resins, tackifiers, waxes, plasticizers, antioxidants and filler or combinations thereof.

In embodiments, an optional plasticizer may be added to the hot melt adhesives or pressure sensitive adhesives. The plasticizer may be added before or after the addition of an adhesion promoter to the adhesive, but it is more desirable to add the plasticizer before the addition of the adhesion promoter to lower the initial viscosity of the adhesive.

Examples of the optional plasticizer suitable for use herein may include, for example, paraffinic linear oil, naphthenic cycloaliphatic oil, aromatic ring containing oil, white mineral oil commercially available as KAYDOL oil, polyisobutylene commercially available as INDOPOL H300, pentaerythritol tetrabenzoate commercially available as BENZOFLEX S552 (Velsicol Chemical Corporation), trimethyl titrate, commercially available as CITROFLEX 1 (Monflex Chemical Company), N,N-dimethyl oleamide, commercially available as HALCOMID M-18-OL (C. P. Hall Company), a benzyl phthalate, commercially available as SANTICIZER 278 (Ferro Corporation), mixtures thereof and the like.

In embodiments, the optional plasticizer may be added to the adhesive, for example, in the amount of from about 0.5 to about 20% by weight, such as from about 3 to about 15% by weight or from about 4 to about 10% by weight.

The most common general purpose hot melt adhesive is based on ethylene vinyl acetate (EVA) resins. Other polymers commonly used in hot melt adhesives and pressure sensitive adhesives include low density polyethylene, poly(ethylene/vinyl acetate), polyvinyl alcohol, polystyrene, polyamides, polyalkylene oxide, polyacrylate, ethylene acrylic copolymers, polypropylene (atactic), phenoxy resins, polyesters, APAO, polyesteramides, polyparaffins, polyurethanes, polyurethane prepolymers, thermalplastic acrylic polymers butyl rubbers, polyvinyl acetate and copolymers, styrenic block copolymers (SIS, SBS, SEBS), phenol-formaldehyde resin of polymer or block copolymer, natural rubber, and a copolymer thereof etc.

Examples of suitable polymer resins that may be optionally used in the hot melt adhesives or pressure sensitive adhesives formulations, or added to commercially available adhesive formulations, include poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(methyl methaerylate-isoprene), poly(ethyl methacrylate-isoprene), poly(propyl methacrylate-isoprene), poly (butyl methacrylate-isoprene), poly(methyl acrylate-isoprene), poly(ethyl acrylate-isoprene), poly(propyl acrylate-isoprene) and poly(butyl acrylate-isoprene), poly (styrene-butadiene), poly(methylstyrene-butadiene), poly (styrene-isoprene), poly(methylstyrene-isoprene), poly(styrene-propyl acrylate), poly(styrene-butyl acrylate), poly (styrene-butadiene-acrylic acid), poly(styrene-butadiene-methacrylic acid), poly(styrene-butadiene-acrylonitrile-acrylic acid), poly(styrene-butyl acrylate-acrylic acid), poly (styrene-butyl acrylate-methacrylic acid), poly(styrene-butyl acrylate-acrylononitrile), and poly(styrene-butyl acrylate-acrylononitrile-acrylic acid), block copolymer such as styrene-isoprene-styrene (SIS) or styrene-butadiene-styrene (SBS), polyester or mixtures thereof and the like.

In embodiments, the polymer resin content in the hot melt adhesives or pressure sensitive adhesives may be in the amount of from about 20 to about 50% by weight, such as from about 25 to about 35% by weight.

Examples of optional tackifiers used in hot melt adhesives and pressure sensitive adhesives include aliphatic and aromatic resins, hydrocarbons and hydrogenated hydrocarbons or mixed C5/C9 resins, modified rosin, natural tackifiers are rosin acid derivatives and their esters, terpene resins, pure monomers, hydrogenated pure monomers etc. and combinations thereof. Examples of the optional tackifier suitable for use herein may be Eastotac H100-W, Regalite S1100, Foralyn 110 from Eastman Chemical.

In embodiments, the optional tackifier may be added to the adhesive, for example, in the amount of from about 5 to about 30% by weight.

Examples of the optional wax suitable for use in the adhesive may include natural and synthetic waxes. Examples of natural waxes may include animal wax such as beeswax and lanolin wax, vegetable wax such as carnauba wax, mineral wax such as montan wax and paraffin wax, microcrystalline wax and slack wax. Examples of synthetic waxes suitable for used herein may include polyethylene wax such as homopolymer wax and copolymer wax and modified polymer wax, polypropylene wax such as homopolymer wax and modified polymer wax, semicrystalline flexible polyolefines, and Fisher-Tropsch wax such as homopolymer wax and modified polymer wax.

In embodiments, the optional wax may be added to the adhesive, for example, in the amount of from about 5 to about 20% by weight. In embodiments, the wax may have a melting point for example from about 50° C. to about 150° C.

Examples of the optional antioxidant suitable for use in the adhesive Include primary and secondary antioxidant or multifunctional antioxidant, hydroxylamines, N,N'-hexamethylene bis(3,5-di-tert-butyl-4-hydroxy hydrocinnamamide) (IRGANOX 1098, available from Ciba-Geigy Corporation), 2,2-bis(4-(2-(3,5-di-tert-butyl-4-hydroxyhydrocinnamoyloxy)) ethoxyphenyl)propane (TOPANOL-205, available from ICI America Corporation), tris(4-tert-butyl-3-hydroxy-2,6-dimethyl benzyl) isocyanurate (CYANOX 1790, 41,322-4, LTDP, Aldrich D 12,840-6), 2,2'-ethylidene bis(4,6-di-tert-butylphenyl)fluoro phosphonite (ETHANOX-398, available from Ethyl Corporation), tetrakis(2,4-di-tert-butylphenyl)-4,4'-biphenyl diphosphonite (ALDRICH 46,852-5; hardness value 90), pentaerythritol tetrastearate (TCI America #PO739), tributylammonium hypophosphite (Aldrich 42,009-3), 2,6-di-tert-butyl-4-methoxyphenol (Aldrich 25,106-2), 2,4-di-tert-butyl-6-(4-methoxybenzyl)phenol (Aldrich 23,008-1), 4-bromo-2,6-dimethylphenol (Aldrich 34,951-8), 4-bromo-3,5-didimethylphenol (Aldrich B6,420-2), 4-bromo-2-nitrophenol (Aldrich 30,987-7), 4-(diethyl aminomethyl>2,5-dimethylphenol (Aldrich 14,668-4), 3-dimethylaminophenol (Aldrich D14,400-2), 2-amino-4-tert-amylphenol (Aldrich 41,258-9), 2,6-bis(hydroxymethyl)-p-cresol (Aldrich 22,752-8), 2,2'-methylenediphenol (Aldrich B4,680-8), 5-(diethylamino)-2-nitrosophenol (Aldrich 26,951-4), 2,6-dichloro-4-fluorophenol (Aldrich 28,435-1), 2,6-dibromo fluoro phenol (Aldrich 26,003-7), α-trifluoro-o-cresol (Aldrich 21,979-7), 2-bromo-4-fluorophenol (Aldrich 30,246-5), 4-fluorophenol (Aldrich F1,320-7), 4-chlorophenyl-2-chloro-1,1,2-tri-fluoroethyl sulfone (Aldrich 13,823-1), 3,4-difluoro phenylacetic acid (Aldrich 29,043-2), 3-fluorophenylacetic acid (Aldrich 24,804-5), 3,5-difluoro phenylacetic acid (Aldrich 29,044-0), 2-fluorophenylacetic acid (Aldrich 20,894-9), 2,5-bis (trifluoromethyl) benzoic acid (Aldrich 32,527-9), ethyl-2-(4-(4-(trifluoromethyl)phenoxy)phenoxy)propionate (Aldrich 25,074-0), tetrakis (2,4-di-tert-butyl phenyl)-4,4'-biphenyl diphosphonite (Aldrich 46,852-5), 4-tert-amyl phenol (Aldrich 35,384-2), 3-(2H-benzotriazol-2-yl)-4-hydroxy phenethylalcohol (Aldrich 43,071-4), NAUGARD 76, NAUGARD 445, NAUGARD 512, AND NAUGARD 524 (manufactured by Uniroyal Chemical Company), and the like, as well as mixtures thereof.

In embodiments, the optional antioxidant may be added to the adhesive, for example, in the amount of from about 0.1% to about 2%.

Examples of the optional filler suitable for use in the adhesive include titanium dioxide, calcium carbonates, zinc oxide, clays, talcs and barium sulfate.

When the admixed silane composition used as an adhesion promoter is added to a hot melt adhesive, the first step is to heat the adhesive to the application temperature until the adhesive is substantially melted or flows. Then the adhesion promoter may be added to the adhesive while keeping the application temperature and the speed of the agitation controlled. The application temperature is determined by the adhesive formulation. The speed of the agitation may be controlled from about 100 to about 500 rpm.

The adhesion promoter may be added to the adhesive formulation in amounts of from about 0.05 weight percent to about 5 weight percent of the adhesive formulation, such as from about 0.5 weight percent to about 3 weight percent or from about 1 weight percent to about 2 weight percent of the adhesive formulation.

By chemically bonding to both the adhesive and the substrate, the admixed adhesion promoter promotes the adhesion of an adhesive to a substrate having an oil contaminated surface with a Surface Free Energy (SFE) from less than about 30 $mN/m^2$, such as from about 8 $mN/m^2$ to less than about 30 $mN/m^2$, such as from about 10 $mN/m^2$ to about 28 $mN/m^2$ or from about 15 $mN/m^2$ to about 25 $mN/m^2$.

In embodiments, the adhesive may display a viscosity ranging for example from about 1,000 centipose to about 20,000 centipose at temperatures ranging for example from about 100° C. to about 200° C.

In embodiments, the optional filler may be added to the adhesive, for example, in the amount of from about 0.1% to about 5%.

In embodiments, the hot melt adhesive or pressure sensitive adhesive may be applied to a substrate, and the adhesion promoter may be present at the interface between the substrate and the adhesive. The adhesive may be used to bind such articles.

In embodiments, the substrate may be a Xerographic print, including Xerographic prints contaminated with fuser oil, such as silicone oil. The substrate may include cast coat paper, gloss or silk coated paper, matte or plain paper, synthetic paper and offset pre-print forms. Other suitable articles that may be bound include, for example, books and laminating cards.

Embodiments described above will now be further illustrated by way of the following examples.

EXAMPLES

Preparation of Buffer Solution

About 30 g of potassium phosphate monobasic ($KH_2PO_4$) powder was dissolved in about 90 g of distilled water at about room temperature, approximately 25° C.

Preparation of Silane Promoters 1-4

Silane Promoter 1

About 8 g of Buffer Solution was added into about 50 g of N-(2-aminoethyl)-3-aminopropylmethyldimethoxysilane (Silane B) at about room temperature, approximately 25° C., while being agitated. The resulting silane composition was stirred for about 3 hours prior to use.

Silane Promoter 2

About 15 g of N-(2-aminoethyl)-3-aminoisobutyldimethylmethoxysilane (Silane A) was mixed together with about 35 g of N-(2-aminoethyl)-3-aminopropylmethyldimethoxysilane (Silane B) at a ratio of about 30:70. About 8 g of Buffer Solution was added into this mixture at about room temperature, approximately 25° C., while being agitated. The resulting silane composition was stirred for about 3 hours prior to use.

Silane Promoter 3

About 25 g of N-(2-aminoethyl)-3-aminoisobutyldimethylmethoxysilane (Silane A) was mixed together with about 25 g of N-(2-aminoethyl)-3-aminopropylmethyldimethoxysilane (Silane B) at a ratio of about 50:50. About 8 g of Buffer Solution was added into this mixture at about room temperature, approximately 25° C., while being agitated. The resulting silane composition was stirred for about 3 hours prior to use.

Silane Promoter 4

About 35 g of N-(2-aminoethyl)-3-aminoisobutyldimethylmethoxysilane (Silane A) was mixed together with about 15 g of N-(2-aminoethyl)-3-aminopropylmethyldimethoxysilane (Silane B) at a ratio of about 70:30. About 8 g of Buffer Solution was added into this mixture at about room temperature, approximately 25° C., while being agitated. The resulting silane composition was stirred for about 3 hours prior to use.

Preparation of Adhesives 1-8

Adhesive 1

About 100 g of HM220 (a hot melt adhesive available from HORIZON) was heated to about 180° C. in a container with a heating mantle. Into the melt adhesive, about 5 g of plasticizer KAYDOL white mineral oil (available from Crompton Corp.) was added with an agitation speed of about 250 rpm, followed by an addition of about 2.5 g of the Silane Promoter 1 over about 10 minutes. The resulting adhesive was stirred at about 180° C. for about another 30 minutes before it was discharged.

Adhesive 2

About 100 g of HM220 (a hot melt adhesive available from HORIZON) was heated to about 180° C. in a container with a heating mantle. Into the melt adhesive, about 5 g of plasticizer KAYDOL white mineral oil (available from Crompton Corp.) was added with an agitation speed of about 250 rpm, followed by an addition of about 2.5 g of the Silane Promoter 2 over about 10 minutes. The resulting adhesive was stirred at about 180° C. for about another 30 minutes before it was discharged.

Adhesive 3

About 100 g of HM220 (a hot melt adhesive available from HORIZON) was heated to about 180° C. in a container with a heating mantle. Into the melt adhesive, about 5 g of plasticizer KAYDOL white mineral oil (available from Crompton Corp.) was added with an agitation speed of about 250 rpm, followed by an addition of about 2.5 g of the Silane Promoter 3 over about 30 minutes. The resulting adhesive was stirred at about 180° C. for about another 30 minutes before it was discharged.

Adhesive 4

About 100 g of HM220 (a hot melt adhesive available from HORIZON) was heated to about 180° C. in a container with a heating mantle. Into the melt adhesive, about 5 g of plasticizer KAYDOL white mineral oil (available from Crompton Corp.) was added with an agitation speed of about 250 rpm, followed by an addition of about 2.5 g of the Silane Promoter 4 over about 10 minutes. The resulting adhesive was stirred at about 180° C. for about another 30 minutes before it was discharged.

Adhesive 5

About 300 g Adhesive 1 was aged in oven at about 180° C. for about 70 hours.

Adhesive 6

About 300 g Adhesive 2 was aged in oven at about 180° C. for about 70 hours.

Adhesive 7

About 100 g Adhesive 3 was aged in oven at about 180° C. for about 70 hours.

Adhesive 8

About 100 g Adhesive 4 was aged in oven at about 180° C. for about 70 hours.

Testing of Adhesive

Viscosity

The viscosity of adhesives was measured by an AR2000 Rheometer in a temperature range of from about 180° C. to about 120° C. at a shear rate of about 100 (1/s).

Thermal Stability

The thermal stability of the adhesives was evaluated by monitoring the viscosity of an adhesive sample in an oven at about 180° C. for over about 70 hours.

The viscosity of the different adhesives prior to being aged is demonstrated below in Table 1.

TABLE 1

Viscosity of Hot Melt Adhesives Modified by Silane Mixture Silane B/Silane A treated by Potassium Phosphate Monobasic Solution (Fresh Glue Viscosity at 180° C.)

| Adhesive Description | Silane Mixing Ratio | Fresh Adhesive Viscosity (cp) at 180° C. |
|---|---|---|
| Comparative Adhesive 1 | Silane B:Silane A = 1:0 | 4446 |
| Adhesive 2 | Silane B:Silane A = 7:3 | 4255 |
| Adhesive 3 | Silane B:Silane A = 5:5 | 4088 |
| Adhesive 4 | Silane B:Silane A = 3:7 | 4090 |

The viscosity of the different adhesives after aging are demonstrated below in Table 2.

TABLE 2

Viscosity of Hot Melt Adhesives Modified by Silane Mixture Silane B/Silane A treated by Potassium Phosphate Monobasic Solution (Aged in Oven at about 180° C. for about 70 Hours)

| Adhesive Description | Silane Mixing Ratio | Viscosity (cp) after aging at 180° C. for 70 hours |
|---|---|---|
| Comparative Adhesive 5 | Silane B:Silane A = 1:0 | 6284 |
| Adhesive 6 | Silane B:Silane A = 7:3 | 5644 |
| Adhesive 7 | Silane B:Silane A = 5:5 | 5153 |
| Adhesive 8 | Silane B:Silane A = 3:7 | 4943 |

The viscosity increases over time, which is demonstrated below in Table 3.

TABLE 3

Viscosity variation of Hot Melt Adhesives Modified by Silane Mixture Silane B/Silane A treated by Potassium Phosphate Monobasic Solution (viscosity increases after aging in Oven at about 180° C. for about 70 Hours)

| Adhesive Description (After Aging) | Adhesive Description (Before Aging) | Silane Mixing Ratio | Viscosity Increase Over Time $\Delta\eta$ (cp) |
|---|---|---|---|
| Comparative Adhesive 5 | Comparative Adhesive 1 | Silane B:Silane A = 1:0 | 1838 |
| Adhesive 6 | Adhesive 2 | Silane B:Silane A = 7:3 | 1389 |
| Adhesive 7 | Adhesive 3 | Silane B:Silane A = 5:5 | 1065 |
| Adhesive 8 | Adhesive 4 | Silane B:Silane A = 3:7 | 853 |

Gluability

The gluability of each adhesive was measured by using a tester that simulates a commercial hot melt adhesive binding application, Fuser oil contaminated sheets were used for the gluability test, and were generated by passing a paper (letter size 8.5"×11") through a fusing fixture using known silicone fuser oil, Xerox Fuser Fluid 8R13030. The paper contains from about 10 to about 60 micrograms of fuser oil. An adhesive was applied onto the oil contaminated paper, and laminated with a second piece of paper to form a bound article. Paper tear (the measurement of gluability) was measured by manually separating the article, and visually inspecting the area of the fiber tear. 0% means that there was no paper fiber tear, indicating poor binding adhesion, and 100% is good and means complete adhesion.

Test Results

Gluability test results on Xerographic prints printed on coated and uncoated papers are demonstrated below in Table 4.

TABLE 4

Gluability test results on Xerographic prints oil contaminated by Xerox Fuser Fluid 8R13030

| | Fiber Tear (%) on Xerographic Prints Contaminated by Xerox Fuser Fluid 8R13030 | | | |
|---|---|---|---|---|
| | 10 pt Cornwall coated to coated | 10 pt Cornwall uncoated to uncoated | 10 pt Elite DCG | Luna Matte Fiber |
| Comparative Adhesive 1 | 97.5 | 100 | 100 | 100 |
| Adhesive 2 | 100 | 100 | 92.5 | 100 |
| Adhesive 3 | 97.5 | 95 | 95 | 725 |
| Adhesive 4 | 100 | 100 | 90 | 100 |

TABLE 4-continued

Gluability test results on Xerographic prints oil contaminated by Xerox Fuser Fluid 8R13030

| | Fiber Tear (%) on Xerographic Prints Contaminated by Xerox Fuser Fluid 8R13030 | | | |
|---|---|---|---|---|
| | 10 pt Cornwall coated to coated | 10 pt Cornwall uncoated to uncoated | 10 pt Elite DCG | Luna Matte Fiber |
| Comparative Adhesive 5 | 100 | 100 | 90 | 85 |
| Adhesive 6 | 92.5 | 100 | 90 | 87.5 |
| Adhesive 7 | 100 | 100 | 85 | 70 |
| Adhesive 8 | 95 | 97.5 | 70 | 100 |

The following can be concluded from the above results. First, after Silane B was admixed with potassium phosphate monobasic, the viscosity increased almost 1800 cP after the glue was aged in an oven at an application temperature of about 180° C. for about 70 hours. The viscosity was stabilized less than about 70 hours after Silane B was admixed with the buffer solution as an adhesion promoter.

Second, by using a mixture of Silane B and Silane A, treated with potassium phosphate monobasic solution, as an adhesion promoter, where the mixture ratio of Silane B:Silane A was equal to or less than about 50:50, the viscosity increased about 1000 cp, which is within the operating range of the binding machine after the adhesives aged in an oven at about 180° C. for about 70 hours.

Third, adhesives using an adhesion promoter having a silane mixture of Silane B/Silane A, treated with potassium phosphate monobasic solution, may be used to bind Xerox Fuser Fluid 8R13030 contaminated image prints, and also generate good gluability.

Fourth, after the adhesive was aged in an oven at about 180° C. for about 70 hours, the gluability was kept substantially constant as fresh adhesives.

Fifth, adding about 5 weight percent plasticizer KAYDOL white mineral oil to the glue will further lower the viscosity, but will not adversely affect the gluability.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims. Unless specifically recited in the claim, steps or components of claims should not be implied or imported from the specification or any other claims as to any particular order, number, position, size, shape, angle, color, or material.

What is claimed is:

1. An adhesion promoter for hot melt adhesives and pressure sensitive adhesives, comprising a silane composition formed by admixing at least two hydrolytic silane compounds with an aqueous buffer solution, wherein the at least two hydrolytic silane compounds are selected from the group consisting of N-(2-aminoethyl)-3-aminopropylmethyldimethoxysilane, N-(2-aminoethyl)-3-aminopropylethyldiethoxysilane, 1-amino-2-(dimethylethoxysilyl)propane, N-(2-aminoethyl)-3-aminoisobutyldimethylmethoxysilane, N-(2 aminoethyl)-3-aminopropylsilanetriol, 3-aminopropyldimethylethoxysilane, and 3-aminopropyltris(methoxyethoxyethoxy)silane.

2. The adhesion promoter according to claim 1, wherein the at least two hydrolytic silane compounds are N-(2-aminoethyl)-3-aminoisobutyldimethylmethoxysilane and N-(2-aminoethyl)-3-aminopropylmethyldimethoxysilane.

3. The adhesion promoter according to claim 2, wherein the weight ratio of N-(2-aminoethyl)-3-aminoisobutyldimethylmethoxysilane to N-(2-aminoethyl)-3-aminopropylmethyldimethoxysilane is from about 90:10 to about 10:90.

4. The adhesion promoter according to claim 1, wherein the aqueous buffer solution contains at least one buffer agent.

5. The adhesion promoter according to claim 4, wherein the buffer agent comprises an inorganic salt or an aqueous solution of an inorganic salt.

6. The adhesion promoter according to claim 4, wherein the buffer agent is selected from the group consisting of potassium phosphate dibasic, potassium phosphate monobasic, sodium hydrogen sulfite, and mixtures thereof.

7. The adhesion promoter according to claim 4, wherein the aqueous buffer solution has a pH value ranging from about 2 to about 10.

8. A process of preparing a hot melt adhesive or pressure sensitive adhesive comprising at least substantially melting the hot melt adhesive or the pressure sensitive adhesive and adding the adhesion promoter of claim 1 to the hot melt adhesive or pressure sensitive adhesive.

9. A bound article comprising at least a substrate, a hot melt adhesive or a pressure sensitive adhesive applied on a substrate, wherein the adhesion promoter according to claim 1 is present at the interface between the substrate and the adhesive.

10. A process of forming an adhesion promoter, the process comprising:

admixing a silane composition comprised of at least two hydrolytic silane compounds with at least one aqueous buffer solution, wherein the at least two hydrolytic silane compounds are selected from the group consisting of N-(2-aminoethyl)-3-aminopropylmethyldimethoxysilane, N-(2-aminoethyl)-3-aminopropylethyldiethoxysilane, 1-amino-2-(dimethylethoxysilyl)propane, N-(2-aminoethyl)-3-aminoisobutyldimethylmethoxysilane, N-(2 aminoethyl)-3-aminopropylsilanetriol, aminopropyldimethylethoxysilane, and 3-aminopropyltris(methoxyethoxyethoxy)silane, (3-silane.

11. The process according to claim 10, wherein the admixing comprises adding at least one aqueous buffer solution to the silane composition while agitating the silane composition.

12. The process according to claim 10, wherein the at least two hydrolytic silane compounds are in a ratio of from about 90:10 to about 10:90.

13. The process according to claim 10, wherein the at least two silane compounds are N-(2-aminoethyl)-3-aminoisobutyldimethylmethoxysilane and N-(2-aminoethyl)-3-aminopropylmethyldimethoxysilane.

14. The process according to claim 10, wherein the buffer agent comprises an inorganic salt or an aqueous solution of an inorganic salt.

15. The process according to claim 14, wherein the inorganic salt is selected from the group consisting of an alkali metal phosphate and an alkali metal sulfite.

16. The process according to claim 10, further comprising adding the admixture of the silane composition and the buffer solution to a melted hot melt adhesive or a pressure sensitive adhesive.

17. A hot melt adhesive or pressure sensitive adhesive comprised of:

at least one adhesive material, and at least one adhesion promoter comprising a silane composition including at least two hydrolytic silane compounds with an aqueous buffer solution, wherein the at least two hydrolytic silane compounds are selected from the group consisting of N-(2-aminoethyl)-3-aminopropylmethyldimethoxysilane, N-(2-aminoethyl)-3-aminopropylethyldiethoxysilane, 1-amino-2-(dimethylethoxysilyl)propane, N-(2-aminoethyl)-3-aminoisobutyldimethylmethoxysilane, N-(2 aminoethyl)-3-aminopropylsilanetriol, aminopropyldimethylethoxysilane, and 3-aminopropyltris(methoxyethoxyethoxy)silane.

18. The adhesive according to claim 17, wherein the at least two hydrolytic silane compounds are N-(2-aminoethyl)-3-aminoisobutyldimethylmethoxysilane and N-(2-aminoethyl)-3-aminopropylmethyldimethoxysilane.

19. The adhesive according to claim 17, wherein the silane composition comprises from about 0.1 to about 5 weight percent of the total adhesive.

20. The adhesive according to claim 17, wherein the at least one adhesive material comprises at least one polymer resin and a tackifier.

21. The adhesive according to claim 20, wherein the at least one adhesive material further comprises a wax, a plasticizer, an antioxidant and/or a filler.

22. The adhesive according to claim 17, wherein the at least two hydrolytic silane compounds are in a weight ratio of from about 90:10 to about 10:90.

* * * * *